United States Patent [19]

Lee et al.

[11] 4,448,822
[45] May 15, 1984

[54] APPARATUS AND METHOD FOR THE PRODUCTION OF GAS FILTERS

[75] Inventors: Kung-You Lee, Wappingers Falls, N.Y.; Jackson K. Chiou, Bakersfield, Calif.; Matthew A. McMahon, Wappingers Falls, N.Y.

[73] Assignee: Texaco Inc., White Plains, N.Y.

[21] Appl. No.: 392,856

[22] Filed: Jun. 28, 1982

[51] Int. Cl.³ .............................................. B05D 1/02
[52] U.S. Cl. .................................. 427/430.1; 427/340; 427/435; 427/376.2; 427/376.4; 502/439
[58] Field of Search ................... 427/345, 126.4, 430.1, 427/376.2, 376.4; 423/628; 252/463; 422/239, 225, 226, 233, 234, 236, 237, 189, 297, 238

[56] References Cited

U.S. PATENT DOCUMENTS

| | | | |
|---|---|---|---|
| 406,597 | 7/1889 | Schupphaus et al. | 422/238 X |
| 2,958,582 | 11/1960 | Hervert et al. | 423/628 X |
| 3,231,520 | 1/1966 | Leak et al. | 252/463 |
| 3,991,164 | 11/1976 | Scheibitz et al. | 422/225 X |
| 4,287,098 | 9/1981 | Farnworth et al. | 252/463 |

*Primary Examiner*—Sam Silverberg
*Attorney, Agent, or Firm*—Carl G. Ries; Robert A. Kulason; Martin M. Glazer

[57] ABSTRACT

An apparatus for coating a substrate with an alumina hydrate film includes a coating vessel having at least one support therein; the substrate to be coated is mounted on the support; and at least one porous or perforated container for holding aluminum metal to react with a caustic solution to form an aluminate coating solution is also mounted on the support. The apparatus can also contain means for mechanical agitation, such as a rotational stirring device. In the coating of the substrate a caustic solution is contacted with a substrate and with at least one porous container having aluminum metal therein. The aluminum metal reacts with the caustic solution to form an aluminate coating solution and then an alumina hydrate film is deposited on the substrate. The caustic solution is preferably subjected to mechanical agitation during the coating process.

9 Claims, 4 Drawing Figures

APPARATUS AND METHOD FOR THE PRODUCTION OF GAS FILTERS

This invention relates to an improved apparatus and method for the large scale production of gas filters, and more particularly for an apparatus and a method of forming such filters with more uniform coatings.

DESCRIPTION OF THE PRIOR ART

In recent years, governments have become increasingly aware of the dangers to public health resulting from exhaust fumes of internal combustion engines. Among the constituents of exhaust gases which give rise to concern are carbon monoxide, unburnt hydrocarbons, nitrogen oxides, carbon containing particulate matter, and lead containing particulate matter. Regulations have been issued in many countries to reduce the amount of such emissions in exhaust gases. Attempts have been made to satisfy the requirements of such regulations in several ways:

(a) Internal combusion engines have been designed so that they operate in such a manner as to produce an inherently "cleaner" exhaust.

(b) Gasoline in which the added lead content is reduced or absent, is being sold on a wider scale than previously.

(c) Attempts have been made to filter the exhaust, or to provide a catalyst which would lead to a more complete combustion of carbon monoxide and unburnt hydrocarbons.

While progress has been made with the first two of the methods set out above, they have the disadvantage that the development of a completely new engine for motor vehicles is extremely expensive so that manufacturers would wish, as far as possible, to continue to produce engines whose development has already largely been carried out. In addition, the production of lead-free gasoline means that refineries would need to be run in a less efficient manner and use more crude oil than is possible when the octane rating of lower-octane hydrocarbons can be increased by the inclusion of lead compounds.

U.S. Pat. No. 3,231,520 and British Pat. No. 1,058,706 disclose a structure comprising a substrate having an adherent film or layer of alumina formed thereon which serves as a support for catalytic materials to promote a variety of reactions including the oxidation of exhaust gases from internal combustion engines. The adherent alumina film is formed by contacting the substrate with a coating solution of an alkali metal aluminate which deposits a film of alumina hydrate on the substrate. The film is then dried and calcined to produce a hard tenacious film of alumina. U.S. Pat. No. 3,227,659 discloses that the alumina coated structure of U.S. Pat. No. 3,231,520, may be impregnated with a phosphorus-containing material such as an alkali metal phosphate which is useful for the treatment of exhaust gases containing lead-containing particulate matter. U.S. Pat. No. 3,410,651 discloses that the alumina coated structure of U.S. Pat. No. 3,231,520 may be impregnated with a chromium-containing material, such as an alkali or alkaline earth metal chromate, for treating exhaust gases containing lead-containing particulate matter. U.S. Pat. No. 3,362,783 discloses a useful configuration of the alumina coated structure wherein the structure comprises metal wool encased in a metal casing prior to coating with the alumina film so that the alumina coats not only the metal fibers, but also coats the casing thereby bonding the metal fibers to the inside of the casing. This particular structure was effectively employed in the treatment of exhaust gases when it was coated or impregnated with an oxidation catalyst. These alumina coated structures have the ability to withstand severe abrading and vibration which makes them particularly useful as a catalyst support for the treatment of automobile exhaust gases.

British Pat. No. 1,271,710 discloses that alumina coated substrates may also be used for the treatment of exhaust gases without the necessity of impregnating or coating the alumina film with added compounds.

Belgian Pat. No. 849,373 (also French Pat. No. 75.39408) notes certain difficulties encountered when attempting to carry out an alumina coating process, and proposes a method of using changes in the concentration of the coating solution to effect coating. The disclosed process is quite expensive, due to the energy required for evaporation of large amounts of water.

It is also known from coassigned U.S. Pat. No. 4,287,098, that exhaust gas filters can be produced by a method which comprises mounting a plurality of the substrates upon a stand, immersing the stand in an alkali metal aluminate solution and subjecting the stand to vertical motion through the alkali metal aluminate solution while alumina hydrate is deposited onto the substrates.

In previous processes of forming the aluminate coating solution and of coating a substrate with alumina hydrate, the heat and hydrogen gas bubbles generated from the reaction of the aluminum metal and the caustic solution provided a limited amount of mixing and achieved some uniformity of the coating solution.

The processes and apparatus described in the prior art were suitable for the manufacture of small numbers of coated substrates for use as gas filters, catalyst supports and the like, but problems were encountered in attempting to manufacture such coated substrates on a larger scale, which would be necessary if they were, for instance, to be made a standard fitting for motor vehicles.

In the processes described in the prior art some aluminum metal, usually in pellet form, was generally added to a caustic solution to form a sodium aluminate solution and more aluminum metal was subsequently added to the coating solution as alumina hydrate deposited onto the substrate. The additional aluminum metal was necessary since as alumina hydrate deposited onto the substrate the concentration of aluminum in the solution decreased and if no more aluminum metal was added, coating would eventually cease before a coating of desired thickness was formed on the substrates. The total quantity of aluminum metal necessary for proper coating cannot generally be added to the caustic solution at the beginning of the coating process, since too high a concentration of dissolved aluminum in the solution in a local area surrounding the aluminum metal, due to lack of good mixing, can cause precipitation of alumina instead of coating. The use of a large ingot of aluminum metal as in U.S. Pat. No. 4,287,098 may not have the alumina precipitation problem, but it is undesirable since a large ingot reacts too slowly with the caustic solution and causes an undesirable prolonged coating period. Further, the method of charging aluminum metal in the prior art can result in aluminum metal falling to the bottom of the coating vessel and in the formation of insoluble products on the bottom of the coating vessel. The reaction products are difficult to remove from the reaction vessel bottom and can reduce the yield in the process.

The addition of several batches of aluminum metal during the coating of the substrate would have serious drawbacks in the large scale or commercial production of alumina coated substrates. First, some system would have to be devised for adding aluminum metal as required to the coating tanks, and distributing the aluminum metal evenly on the supports within the coating vessel. The portion of such a distribution system within the coating vessel should not occupy too much of the interior volume of the coating vessel. Further, the reaction of aluminum metal with the caustic solution produces hydrogen gas. A commercial system would require the hydrogen gas to be safely removed, while still allowing the addition of aluminum metal in several batches.

It has been found also that there is some difficulty in ensuring that substantially equal quantities of alumina are deposited upon each substrate and upon all surfaces of each substrate when a plurality of substrates are coated in a large vessel. It has been found that when substrates were simply immersed in an aluminate coating solution, there was considerable variation in the weight of alumina deposited upon individual substrates located in various portions of the coating solution and upon various portions of each substrate. Such large variations occur even when aluminum metal was constantly in contact with the solution, and when the hydrogen gas bubbles and heat produced during the reaction of the aluminum metal with the alkali solution agitated the solution.

The above enumerated problems will make it difficult to employ the previous used processes which were generally used on a bench scale, and which must be adapted for large scale commercial plants.

SUMMARY OF THE INVENTION

A new apparatus and method for the coating of substrates for use as exhaust filters, catalyst supports and the like, now has been discovered. The new apparatus for coating a plurality of substrates with alumina hydrate comprises a coating vessel, at least one support on which are mounted the substrates and at least one porous container for holding aluminum metal to react with a caustic solution to form an aluminate coating solution. The apparatus preferably also comprises means for mechanically agitating the aluminate coating solution used to coat the substrates and preferably maintains a substantially uniform concentration of the coating solution throughout the coating vessel. The mechanical agitation means preferably comprises a rotational stirring device, most preferably a flat blade turbine. One rotational stirring device is preferably associated with each support, with the rotational stirring device being preferably mounted substantially parallel to the support.

The new method for coating a substrate with an alumina hydrate film comprises the steps of contacting a caustic solution with the substrate to be coated and with at least one porous container having aluminum metal therein, reacting the aluminum metal with the caustic solution to form an aluminate coating solution, and depositing alumina hydrate on the substrate. The aluminate coating solution is preferably subjected to mechanical agitation causing the aluminate coating to be maintained in a state of substantial uniformity, and to flow over the surfaces of the substrate while alumina hydrate is deposited on the substrate. The new method is able to form a coating on the substrate which is much more uniform throughout each substrate, from substrate to substrate, and from batch to batch without any movement of the substrate. The quality of the coating is consistantly good being uniform and adherent, as compared to other coating methods which can produce poor nonuniform and nonadherent coatings under certain conditions.

Mechanical agitation is preferably produced by a rotational stirring device. It has been found that the rotational stirring causes the coating solution to have a more uniform concentration throughout and causes the coating solution to flow more uniformly past the surfaces of each substrate. The mechanical agitation, by achieving a more uniform solution and a more uniform flow of coating solution, can deposit a more uniform coating on the surfaces of the substrate than previous methods. Further, the depth of the coating has been found to be more uniform from substrate to substrate, and batch of substrates to batch of substrates than that achieved by previous methods.

BRIEF DESCRIPTION OF THE DRAWING

An embodiment of the present invention will be illustrated by way of examples and by way of the accompanying figures in which.

DESCRIPTION OF THE DRAWING

Figure 1:
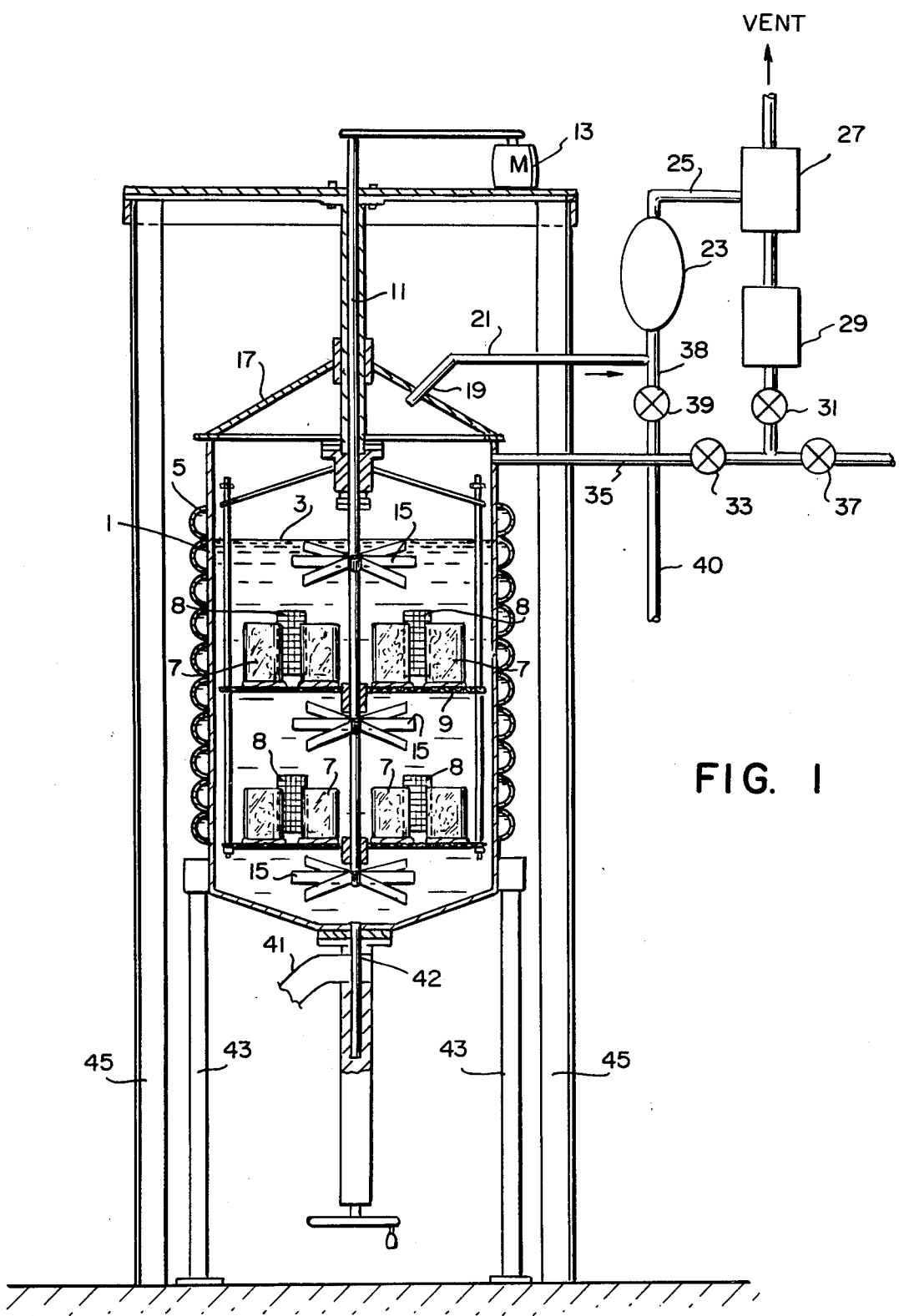
FIG. 1 is a view of an apparatus, partially in cross section, for carrying out the method of the present invention.

Referring now to FIG. 1, the preferred apparatus illustrated comprises a cylindrical coating vessel or tank (1) which is formed of a material resistant to the caustic aluminate coating solution (3), such as stainless steel. The tank (1) is provided with external means for controlling the temperature of the coating vessel (1) and its contents which means is depicted as a steam and/or water jacket (5). A plurality of cased substrates (7) and porous or perforated containers (8) are shown mounted on two supports or shelves (9) contained within the tank (1) and vertically spaced apart from one another.

Each support (9), is formed of an open or perforated material such as wire mesh or expanded metal sheet material, to provide for free circulation of the caustic solution (3) in the tank (1). The support (9) preferably has an open area of from about 50 to about 80 percent.

The support (9) can be formed of a metal or nonmetal which will not be adversely affected by the coating solution (3). The support (9) is preferably mounted horizontally within the coating tank (1) with the substrates (7) and porous containers (8) preferably attached in some manner to the support (9).

In accordance with the embodiment of the invention depicted in FIG. 1, the tank or vessel (1) is provided with means for mechanical agitation which is depicted as a mechanical rotational stirring means comprising a shaft (11), motor means (13), and a rotational stirring device here a flat blade turbine (15). The mechanical rotational stirring means enables the caustic aluminate coating solution (3) to be mechanically agitated and circulated throughout the tank (1). The shaft (11) is driven by motor means (13). One flat blade turbine (15) is shown located beneath and substantially parallel to each of the supports (9) and one turbine (15) is shown above the top support. More or less turbines (15) can be used as desired.

The tank (1) is depicted as provided with a cover or cap (17) having a gas venting means (19). The cover (17) is used to seal the tank (1) and prevent the escape of any gas from the tank (1) to the operating room. During the reaction of the aluminum metal in the porous container (8) a foam is produced comprising the coating solution (3), hydrogen gas, steam and possibly other gases. The gas exits through the vent (19) and then passes through a conduit (21), a foam breaker (23) and a second conduit (25) into a condenser (27). Within the condenser (27) the gases are cooled and water from the condenser (27) passes into a receiver (29). From the receiver (29) the water passes back into the coating tank (1) through valves (31), (33) and return conduit (35). Hydrogen gas and other non condensible gases pass through a vent from the condenser (27) into the atmosphere. The recycling of water through the condenser (27) back to the coating tank (1) eliminates the loss of water from the system and reduces the need for additional water to be made up to the system. However, further quantities of water or further quantities of coating solution can be added to the system through the valve (37) and then through valve (33) and return conduit (35) into the coating tank (1). Conduit (38), value (39), and conduit (40) are an emergency exit for foam if a severe foaming occurs pushing a large amount of foam into foam breaker (23). The conduit (40) carries the foam to a holding tank (not shown).

A pipeline (41) in the lower end of tank (1) provides means of transferring or withdrawing coating solution (3) to or from the tank (1), as desired, when a valve (42) is opened. The valve (42) is preferably of the ram type to prevent blocking of the valve (42) and pipeline (41) by sediment or precipated alumina. The tank (1) is supported on legs (43). Framework (45) provides support for the motor means (13) and a bearing for the shaft (11).

The turbine (15) is preferably located about 2 or 3 centimeters below the support (9) and below the surface of the coating solution (3) however, the turbine (15) can also be located closer or further from the support (9). The turbine (15) preferably has a diameter of from about 35 to about 65 percent of the diameter of the coating tank (1) with about 50 percent being the most preferred diameter.

The turbine (15) is rotated substantially parallel to the support (9) through the solution (3) at a tip speed preferably within the range of about 15 to about 150 meters per minute. In the type of tank (1) illustrated, which has a volume of several hundred liters, it has been found that the use of flat blade turbine tip speeds higher than about 150 meters per minute does not result in an improved coating or reduce the time to form a useful coating. Tip speeds below about 15 meters per minute do not satisfactorily agitate the solution, and the ability of the process to uniformly coat the substrate can be impaired. Further, low tip speeds increase the treatment time without any attendant improvement in coating uniformity.

Figure 2:
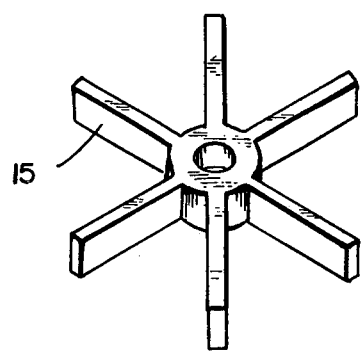
FIG. 2 is an elevational view of the preferred flat blade turbine.

Rotational stirring devices, other than that depicted in FIGS. 1 and 2, such as marine propellers, as well as other mechanical devices for agitating the solution, can have rotational or agitation speeds outside of the preferred range set forth above. The preferred rotational speed or rate of agitation of the other mechancial agitation devices can be readily determined without undo experimentation from the figures and examples set forth.

The portions of the mechanical agitation means, as well as the other components of the coating apparatus which come into contact with the coating solution should not be unacceptably damaged by the coating solution. Useful materials include stainless steel, mild steel and plastic having a melting point above about 120° C.

Coating runs are started by transferring the preheated coating solution (3) through pipeline (41) and valve (42) to the closed coating tank (1) in which the substrates (7) and porous containers (8) (containing aluminum metal) have already been placed on the supports (9). The gas vent (19) has already been connected to the foam breaker (23), condenser (27), and receiver (29). At the end of the coating run, the coating solution (3) is transferred out to another coating tank (not shown) or a solution holding tank (not shown) through valve (42) and pipeline (41). The coating tank (1) is now opened to remove the coated substrates and porous containers.

The apparatus of the present invention can produce a coating on the substrate of consistently high quality and of substantial uniformity. In previously used apparatus and methods, mixing of the coating solution depended to a large degree on the heat and hydrogen gas bubbles produced by the reaction of the aluminum metal and the aqueous solution of alkali base which formed the part of the caustic aluminate coating solution. Previously, the substrates also were inverted or oscillated during the coating process to achieve a useful coating which was still only approximately uniform and not always of consistently good quality. In the process of the present invention, no such inversion or movement of the substrate is necessary. The coating achieved by the process of the present invention generally appears smooth and translucent which indicates that the coating is hard and is adhering to the substrate. Further, when large amounts of aluminum ions are present in the coating solution, the coating quality achieved by the process of the present invention is quite satisfactory, while with the previously used processes the presence of large amounts of aluminum ions in the coating solution many times produced a coating which was white, powdery and nonadherent, and not of the same high quality as with the present process.

The apparatus and method of the present invention is designed with a modular concept. Each support (9) with its own turbine (15) represents a separate module within the coating tank (1). A commercial coating vessel would have many such modules and the width and height of the modules can be varied to be used in wider and larger coating tanks.

The flat blade turbine (15) preferably used in the coating apparatus of FIG. 1 is illustrated in more detail in FIG. 2. The turbine preferably has six blades and a diameter of about one-half that of the tank (1) being used, however, more or less blades, as well as larger or smaller blades can be used. The height of the blades and their thickness will vary depending on the size of the tank used and the quantity of mixing desired. The turbine is preferably formed of a material which will not be adversely affected by the caustic solution. Preferred materials include stainless steel, high melting (above about 120° C.) plastic and various alloys.

Figure 3:
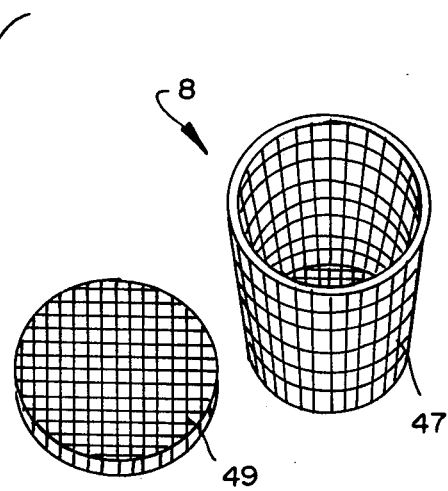
FIG. 3 is an elevational view of one embodiment of a porous container for holding aluminum metal.
Figure 4:
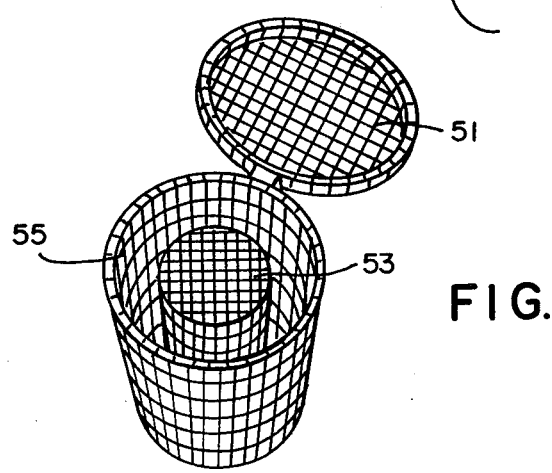
FIG. 4 is an elevational view of a second embodiment of the porous container.

Two preferred porous containers (8) for holding aluminum metal are illustrated in FIGS. 3 and 4. The simplest embodiment of the porous container is illustrated in FIG. 3 and it comprises a cylindrically shaped portion or basket (47) having an open end, and a cover (49) for the open end. Both the cover (49) and basket (47) are preferably formed of a wire mesh, perforated metal or expanded metal material having an opened area from about 50 to about 80 percent. This permits the caustic solution (3) present in the coating tank (1) to easily enter therein. The openings or perforations of the container (8) should be large enough to allow for free circulation of the caustic solution (3), however, the openings or perforations should be small enough to prevent loss of aluminum metal pellets from inside the container (8).

FIG. 4 shows a larger container comprised of a cover (51), a cylindrically shaped center portion (53) surrounded by a substantially concentric annular ring (55). The aluminum metal is stored in the annular ring (55). This permits the caustic solution not only to enter the annular ring (55) from the periphery of the ring (55) but also from the central portion (53). Such a design permits a faster and more complete reaction of the aluminum metal with the caustic solution. The porous container illustrated in FIG. 4 is formed of the same material, i.e. wire mesh or expanded metal as that container illustrated in FIG. 3.

Larger porous containers than that shown in FIG. 4 can also be made. Such containers (not shown) would also have cylindrical center portions, but instead of one annular ring, would have several concentric annular rings, and aluminum metal would be placed in alternate annular rings. Sufficient annular rings would be used to hold the desired quantity of aluminum metal. The caustic solution would be able to circulate through the central portion and through alternate annular rings. Caustic solution would then be able to enter the annular rings filled with aluminum metal from all sides and more efficiently react with the aluminum metal.

The aluminum metal used in the apparatus and method of the present invention is preferably in the form of pellets or other substantially spherically shaped objects having a diameter of from about 0.9 cm. to about 3 cm. It has been found that aluminum pellets having a diameter substantially less than about 0.9, i.e. having too large a surface area per unit weight, such as powder or small granules, reacts too rapidly with the caustic solution. This results in a poor coating and the incorporation of aluminum metal particles into the alumina film on the substrate. Aluminum metal pellets having a diameter substantially larger than about 3 centimeters, i.e. too small a surface area per unit of weight have been found to react too slowly with the caustic solution resulting in a very prolonged coating period. Further, aluminum particles having too small dimensions will pass through the open spaces of the porous container and fall to the bottom of the tank forming a thick layer of reaction residue after several runs.

All the aluminum metal which is necessary for the proper coating of the substrates is placed in the porous containers, thus no aluminum metal is added during the coating process itself. In order to insure a more uniform coating of the substrates, the aluminum metal can be divided into several containers which are preferably symetrically placed around the support.

Preferably, the flat blade turbine is of such a diameter that as it rotates its tips pass under the porous containers. This permits the best circulation of caustic solution into the porous containers while producing an even flow of coating solution to the substrates. To insure an even more uniform solution, the placement of the porous containers on the supports can be varied from support to support so that no one porous container is directly above or below another porous container on another support.

As the aluminum metal reacts with the caustic solution producing the aluminate coating solution, some of the aluminum metal forms an insoluble precipitate which helps to hold the remaining aluminum metal pellets inside the container. For this reason, only a small quantity of aluminum metal pellets and precipitate fall out of the porous container. This prevents aluminum metal or precipitated material from becoming embedded in the alumina coating. The precipitate, however, does not prevent the caustic solution from reacting with the remaining aluminum metal.

Since the quantity of alumina film produced from a given quantity of aluminum is similar from batch to batch using the apparatus and method of the present invention, a known quantity of aluminum metal can be used with a known quantity of caustic solution and a known number of substrates to produce a desired coating thickness on the substrates. This reduces the experimentation necessary when upscaling the process to coat a larger batch of substrates.

The process of forming the aluminate coating solution and the process of forming an adherent alumina hydrate film on a substrate are disclosed in several coassigned U.S. patents including U.S. Pat. Nos. 3,227,659; 3,231,520; and 3,240,698, all of which are incorporated herein by reference. The exact mechanism by which the alumina film forms on the substrate is not precisely known, however, it is known that the deposited film is chiefly a trihydrate phase of the alumina.

Briefly, the preferred caustic solution useful in the present invention for reaction with the aluminum metal in the porous containers can be prepared by dissolving metallic aluminum in a strong aqueous solution of an alkali base, preferably an alkali hydroxide. Alternatively, alumina, or an extract from bauxite or bauxite clay can be dissolved in an aqueous solution of an alkali hydroxide, or commercially prepared alkali aluminate can be dissolved in water.

Preferably, the alkali is sodium, however, the alkali can also be potassium, lithium, rubidium or cesium. Further, other cations similar in properties to alkali metal cations can also be used to form the aluminate salt, as quaternary bases such as benzyl-trimethyl ammonium hydroxide and tetramethyl ammonium hydroxide.

The aluminum metal preferably has a purity of at least 99.75 percent for satisfactory results. Use of less pure metal can result in powdery, non-adherent coatings. More pure aluminum is not required for the process.

The mole ratio of aluminum to sodium in the aluminate coating solution during the coating of the substrates should be at least 0.45, and preferably about 0.6 to 0.8.

The initial concentration of the sodium hydroxide in the coating solution is preferably not less than 0.5 molar, and is preferably in the range of from about 0.75 to 1.5 molar. Such a concentration is desirable so that a serviceable film of alumina can be deposited at a suitable reaction temperature within a reasonable amount of time, preferably from about three to six hours. If the concentration of the sodium hydroxide in the coating solution is substantially more than about 2 molar, it will increase the reaction rate of aluminum considerably. Since the total quantity of aluminum metal is added initially, the reaction might be too violent. Therefore, the concentration of the sodium hydroxide initially in the coating solution should not be over about 1.5 molar.

Preferably, the solution is at a temperature above normal room temperature. It is desirable to have the reaction at a temperature of at least 50° C. Even though a lower temperature can be used, a longer coating time will result. The reaction temperature is preferably about 80° C. to about 95° C. This can be accomplished with the heating and cooling means (5) illustrated in FIG. 1, wherein steam or cooling water can be circulated in a heat exchanger to heat or cool the coating solution.

The preferred embodiment of the process of the present invention, which to date has achieved optimum results is one in which alumina hydrate is deposited on a stainless steel or mesh wire wool from a dilute sodium solution at high temperatures (90°-95° C.) with the alumina in the solution being replenished continuously by the presence of aluminum metal in contact with the coating solution.

Generally, the film of alumina formed should be substantially uniform, and should not be substantially less than about $2 \times 10^{-3}$ centimeter thick, and preferably not less than about $1 \times 10^{-2}$ centimeter thick. Deposits of alumina of almost any thickness are possible, but coatings generally thicker than about $2 \times 10^{-1}$ centimeter are generally not useful. Preferred films are from about $0.5 \times 10^{-2}$ centimeter to $8 \times 10^{-2}$ centimeter thick.

The substrate can be formed of a metal or a nonmetal and can include such materials as stainless steel, nickel, iron, iron alloys, chrome-nickel alloys, titanium, sintered metal materials, refractory or ceramic materials for example high melting point glass, metal oxides e.g., magnesia and silica, or refractory metal silicates or carbides. The substrate is not restricted to any particular configuration and can have any useful configurations such as bars, balls, chains, mesh, plates, saddles, sheets, tubes, wire, ribbons, chopped wire, wire mesh, steel and metal alloy wool, or the like. When the substrate is in a filament form, and is enclosed in a casing or tube, prior to the deposition of the alumina film on the substrate, the adherent film of alumina forms on both the filaments and on the internal surface of the casing or tube, and bonds the filaments to the interior wall of the casing or tube. This is disclosed in coassigned U.S. Pat. No. 3,362,783.

Although the substrate upon which the alumina hydrate is deposited can vary widely, as indicated above, it has been found most convenient to employ knitted steel wire. One suitable form is a cut wire having a nearly circular section and variable thickness and strand length. The wire which is knitted into a stocking and then rolled into a cylinder of the required thickness and weight.

After the alumina trihydrate film has been deposited to a suitable thickness on the substrate as an adherent film, the coated substrate is generally removed from the coating solution, washed with water and subjected to heating to drive off at least a part of the water of hydration. The calcination of the alumina trihydrate film results in a calcined alumina film having a useful porosity and surface area. The size of the pores depends upon the calcination conditions which include temperature, humidity, and the pressure of the atmosphere surrounding the alumina during calcination. A calcination temperature of from about 300° C. to about 700° C. is preferred with a range of about 250° C. to about 900° C. being useful. Temperatures within this range produce an alumina film having a sufficiently high porosity to successfully treat a fluid flow including the exhaust gases of internal combustion engines.

The following examples are given to further illustrate the invention, they are however, not meant to limit the invention.

EXAMPLE 1

A coating tank as illustrated in FIG. 1 was used to coat several batches of substrates. The coating tank had a diameter of about 60 centimeters and had a volume of about 320 liters. Each tank had two supports, mounted horizontally for holding substrates. The supports were formed of expanded metal which had an open area of about 65 percent and had a diameter of about 55 centimeters. The substrates were mounted on each support in two concentric circles. Also, unless otherwise noted, 3 porous containers each filled with about 400 to 900 grams of aluminum metal pellets were symetrically arranged on each support generally in a circular pattern and having a radius about one-half that of the support. The coating tank was formed of stainless steel and had a stainless steel cover with a vent for the removal of hydrogen gas produced in the reaction. The coating tank contained about 230 liters of a caustic solution which comprised about a 1 molar solution of sodium hydroxide and had sufficient sodium aluminate dissolved therein to have an aluminum to sodium molar ratio of about 0.5. During the coating operation the caustic solution was maintained at a temperature of about 97° C.

The substrates which served as models of internal combustion engine exhaust filter cartridges, comprised glass cylinders about 10 centimeters in diameter and about 18 centimeters in height containing about 156 grams of stainless steel wool at a packing density of about 100 grams per liter. The substrates were arranged in two circular patterns on each support, an inner circle and an outer circle. There were generally less substrates in the inner circle than in the outer circle with the inner circle having about 4 to 6 substrates and the outer circle having the remainder of the substrates.

Symetrically arranged on each support were 3 porous containers each filled with about 400 to 900 grams of aluminum pellets. The porous containers were formed from 6 mesh wire cloth, the wire of which had a diameter of about 0.9 millimeter. The wire cloth had an open area of about 63 percent. The porous containers shown in FIG. 3 had a diameter of about 5 centimeters, and a height of about 15 centimeters. The porous containers shown in FIG. 4 had an inside diameter of about 4.5 centimeters, an outside diameter of about 9.5 centimeters, and a height of about 18 centimeters. The porous containers had covers formed of the same material as the body of the containers. The aluminum pellets in each porous container had a diameter of about 1 centimeter. The coating took place for a period of about 5 hours.

The following experimental runs, 1 to 17, were made. Any variations from the coating procedures set forth above are noted. The results, set forth in Table A, include the type of stirring device used, the stirring pattern, the tip speed in meters per minute of the device, and the total number of substrates used in each run.

Also set forth in Table A is the average coating ratio of each run, where the coating ratio for each substrate is defined as the weight of the alumina (converted from weight of alumina hydrate) deposited onto the steel wool divided by the weight of the steel wool. Deviations from the average coating ratio for a group of substrates on a given location on the supports, in percent, is calculated by subtracting the coating ratio run average from the coating ratio of the substrates on a given location, multiplying this result by 100 and dividing by the coating ratio run average. This gives the deviation from the run average, in percent, from the substrates on the inner and outer portion of each support. Further, the percentage of substrates outside of a target range, here the substrates whose ratio of alumina to stainless steel wool deviates more than 15 percent from the average of all the substrates in that particular run, is also set forth in Table A. The number of substrates outside the target range is a indication of the uniformity of the coating process among the various portions of the support. Uniformly coated substrates, wherein the coating weight of the various substrates on a support does not vary greatly from one portion of the support to another, or from one support to another in the coating tank is preferred. The smaller the percent of substrates in a batch outside of the target range, the better the coating process is in terms of producing more uniform substrates.

Runs 1 and 2, wherein 20 substrates were coated in each run, were made using a coating tank having three 6-flat-blade-turbines with each turbine being about 30.5 centimeters in diameter. The blades were about 4 centimeters in height. One turbine was located below each of the two supports used in these two runs and one turbine was located about 3 centimeters below the top surface of the coating solution. In runs 1 and 2, the turbines were rotated counterclockwise at a tip speed of about 23.5 meters per minute. In runs 3 through 5 the same coating conditions existed as in run 1 and 2 except that the turbines were rotated at a tip speed of about 47 meters per minute. Runs 6 and 7 were similar to runs 3 through 5, except that baffle plates (not shown in the figures) were used in the coating tank. Baffle plates which were placed perpendicularly to the supports, altered the circulation of the coating solution within the tanks. From the results tabluated in Table A it can be seen that the higher tip speed of about 47 meters per second produced some of the best results. The percentage of substrates outside the target range was smaller than that achieved with the slower speed.

EXAMPLE 2

In runs 8 to 10, three 6-flat-blade-turbines, about 30 centimeters in diameter were rotated at a tip speed of about 70 meters per minute. The number of substrates outside the target range increased over that found at the lower tip speed of about 47 meters per minute. The results were similar to that obtained at a tip speed of about 23.5 meters per minute. Thus it appears that the best results were obtained at a tip speed of about 47 meters per minute.

EXAMPLE 3

In run 11, 20 substrates were coated. Two 6-flat-blade-turbines, each 20 centimeters in diameter were used. The turbines had a tip speed of about 157 meters per minute and baffles were used in the coating tank as in runs 6 and 7. Poorer results were obtained than in the other runs, with a large percentage of the coated substrates being outside of the target range, however, the deviation for a given support was small.

In run 12, the same conditions existed as in run 11 except that the turbines were rotated at tip speed of about 120 meters per minute, and they were rotated through a cycle which comprised 2 minutes of rotation and 8 minutes of no rotation. This ten minute cycle was repeated throughout the 5 hours of coating. From the results set forth in Table A it can be seen that the percentage of substrates outside the target range was smaller than that achieved with constant turbine rotation, however, the percentage was larger than the best obtained in the runs 3 through 5.

EXAMPLE 4

In run 13, 20 substrates were coated in the coating tank as in run 11, except that the turbines were not rotated. The results are given in Table A. It can be seen that the deviation of the coating ratio of the substrates from support to support was larger in run 13 than that in runs 3 through 7, as were the percentage of substrates outside the target range. Also it is apparent that the substrates on the top support received a heavier coating than those on the bottom support. The quality of the coating on the substrates were not considered as good as that achieved when the flat blade turbines were rotated.

EXAMPLE 5

Runs 14 through 17 used the same coating tank as in Example 1. In runs 14 and 17, 26 substrates were coated, in runs 15 and 16, 18 substrates were coated. No baffle plates were used and the stirring means comprised two marine propellers about 20 centimeters in diameter and having 3 blades in a right hand configuration. In runs 14 to 16, the propellers were rotated at a tip speed of about 250 meters per minute and in run 17, the propellers were rotated at a tip speed of about 125 meters per minute. The percentage of substrates in runs 14 to 17 outside the target range was very large. In runs 14, 15 and 17 this was a result of the heavy coating on the substrates in the outer circle of the bottom support, and on the scattered results from the top supports. Such results are postulated to occur because the marine blades in runs 14, 15 and 17 were rotated clockwise forcing the coating solution up through the inner circle of substrates, resulting in uneven coating on those substrates because of the high flow of coating solution through the substrates. In run 16, the marine propellers were rotated counterclockwise forcing the coating solution down through the inner circle of substrates on the bottom support and resulting in uneven coating on those substrates.

From Table A it can be seen that there are variations in run to run using the various stirring devices. However, it does appear that a flat blade turbine, having a diameter of about one-half that of the coating tank and having a slow to moderate tip speed, produces the smallest number of substrates outside a target range and produces the smallest variation of substrates on a support. The coatings produced by the use of the flat blade turbine, having a diameter of about one-half of the coating tank, generally produces coated substrates with the best visual appearance and produces the best uniformity of substrate coatings within the coating tank. Further, when the target range was increased to plus or minus 20 percent of the average coating weight ratio, the number of substrates outside a target range produced by the preferred process of the present invention using the flat blade turbine was very small, much smaller than that produced by the previous processes wherein no stirring was used.

The above figures and examples are for illustrative purposes only. Numerous substitutions, modifications and changes can be made in the figures and examples without departing from the invention, which is set forth in the following claims.

posited onto said substrates, and then calcining said substrates.

3. The method of claim 1 wherein said substrates and said porous containers are mounted on a support and said flat blade turbine is rotated substantially horizontally to said support at a tip speed of from about 15 to about 150 meters per minute.

4. The method of claim 3 and further comprising the step of symetrically distributing said porous containers among said substrates on said support.

5. The method of claim 1 and further comprising the step of controlling the temperature of said caustic solution and said resulting aluminate coating solution.

6. The method of claim 1 and further comprising the step of sealing said vessel with a cover means having means for venting a gas.

7. The method of claim 6 and further comprising the step of condensing water from said gas and returning said water to said vessel.

8. The method of claim 1 wherein said aluminum metal comprises pellets.

9. The method of claim 8 wherein said aluminum pellets have a diameter of from about 0.9 centimeter to about 3 centimeters.

TABLE A

| | RUN NUMBER | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Stirrer Type | Three 6-Flat-Blade-Turbines, 30 Centimeters in Diameter | | | | | | | Three 6-Flat-Blade-Turbines, 30 Centimeters in Diameter | | | Two 6-Flat-Blade-Turbines, 20 Centimeters in Diameter | | | 2 Marine Propellers - 3 Blades in Right Hand Configuration, 20 Centimeters in Diameter | | | |
| Stirring Pattern | Constant Counterclockwise Rotation | | | | | | | Counterclockwise Constant | | | 2 Minutes On/8 Off | None | | Clockwise Constant | Counter Clockwise Constant | Clockwise Constant | |
| Stirring Tip Speed (M/Min) | 23.5 | 23.5 | 47 | 47 | 47 | 47 | 47 | 70 | 70 | 70 | 157 | 120 | 0 | 250 | 250 | 250 | 125 |
| Total Number of Substrates | 20 | 20 | 20 | 20 | 20 | 20 | 20 | 20 | 20 | 20 | 20 | 20 | 20 | 26 | 18 | 18 | 26 |
| Baffle Plates | NO | NO | NO | NO | NO | YES | YES | NO | NO | YES | YES | YES | YES | NO | NO | NO | NO |
| Coating Ratio | 0.97 | 1.33 | 0.77 | 0.94 | 1.08 | 1.01 | 1.02 | 1.04 | 0.92 | 0.97 | 1.02 | 0.97 | 1.03 | 1.03 | 1.69 | 1.54 | 1.35 |
| Run Average Deviation From Run Average In Percent | | | | | | | | | | | | | | | | | |
| A. Top Support | | | | | | | | | | | | | | | | | |
| 1. Inner Circle Average | +10 | +5 | −5 | −3 | −6 | −2 | −2 | −15 | −11 | −9 | −28 | −12 | +4 | −20 | −50 | +19 | −1 |
| 2. Outer Circle Average | −13 | −10 | +3 | −9 | −10 | −10 | −11 | −8 | −7 | −9 | +7 | −3 | +17 | +2 | −24 | −15 | −16 |
| 3. Support Average | −4 | −4 | +0 | −6 | −8 | −7 | −7 | −11 | −9 | −9 | −8 | −5 | +13 | −7 | −33 | −4 | −10 |
| B. Bottom Support | | | | | | | | | | | | | | | | | |
| 1. Inner Circle Average | +9 | +19 | +14 | +14 | +13 | +15 | +17 | +29 | +16 | +46 | −26 | −10 | −14 | −5 | −15 | −24 | −20 |
| 2. Outer Circle Average | −0 | −6 | −9 | +3 | +9 | +2 | −0 | +1 | +2 | −16 | +29 | +11 | −12 | +15 | +57 | +18 | +29 |
| 3. Support Average | +3 | +4 | −0 | +7 | +10 | +7 | +7 | +11 | +8 | +8 | +7 | +4 | −12 | +8 | +33 | +3 | +10 |
| Filters Outside of Target Range In Percent | 30 | 35 | 5 | 11 | 16 | 5 | 20 | 29 | 20 | 55 | 70 | 25 | 30 | 38 | 89 | 78 | 58 |

What is claimed is:

1. A method for coating a substrate with an alumina hydrate film comprising the steps of contacting a caustic solution in a vessel with a plurality of substrates to be coated and with a plurality of porous containers having aluminum metal therein, reacting said aluminum metal with said caustic solution to form an aluminate coating solution, mechanically agitating said caustic solution with a flat blade turbine having a diameter of about 35 to about 65 percent of the diameter of said vessel, and depositing alumina hydrate on said substrate.

2. The method of claim 1 and further comprising the step of separating said substrates from said aluminate coating solution after a sufficient coating has been de-

* * * * *